United States Patent
Hattersley et al.

(10) Patent No.: US 6,824,061 B1
(45) Date of Patent: Nov. 30, 2004

(54) PHOSPHORESCENT OPTICAL SYMBOL SCANNER

(75) Inventors: John R. Hattersley, Skaneateles, NY (US); Francis O. Blackwell, III, Auburn, NY (US)

(73) Assignee: Industrial Data Entry Automation System Incorporated, Skaneateles, NY (US)

( * ) Notice: Subject to any disclaimer, the term of this patent is extended or adjusted under 35 U.S.C. 154(b) by 0 days.

(21) Appl. No.: 10/633,136

(22) Filed: Aug. 1, 2003

(51) Int. Cl.[7] .................................................. G06K 7/10
(52) U.S. Cl. ............. 235/472.01; 235/468; 235/462.42; 235/462.43; 235/462.44; 235/462.45
(58) Field of Search ........................... 235/472.01, 468, 235/462.42, 462.43, 462.44, 462.45, 472, 462.11

(56) References Cited

U.S. PATENT DOCUMENTS

| | | | | |
|---|---|---|---|---|
| 4,983,817 A | | 1/1991 | Dolash et al. ................ 235/462 |
| 5,525,798 A | * | 6/1996 | Berson et al. ................ 250/271 |
| 5,693,693 A | | 12/1997 | Auslander et al. ............ 524/88 |
| 5,773,808 A | * | 6/1998 | Laser ...................... 235/462.42 |
| 5,786,586 A | * | 7/1998 | Pidhirny et al. ....... 235/472.01 |
| 5,813,752 A | | 9/1998 | Singer et al. ................ 362/293 |
| 5,959,296 A | * | 9/1999 | Cyr et al. .................... 250/271 |
| 6,123,263 A | * | 9/2000 | Feng ...................... 235/462.42 |
| 6,177,683 B1 | * | 1/2001 | Kolesar et al. ............. 250/566 |
| 6,595,422 B1 | * | 7/2003 | Doljack ................. 235/462.42 |
| 2003/0192949 A1 | * | 10/2003 | Hattersley et al. ..... 235/462.43 |
| 2004/0041030 A1 | * | 3/2004 | Nimura et al. ............... 235/468 |

* cited by examiner

*Primary Examiner*—Thien M. Le
*Assistant Examiner*—Allyson N Trail
(74) *Attorney, Agent, or Firm*—Bernhard P. Molldrem, Jr.

(57) ABSTRACT

An hand-held optical symbol scanner assembly employs black-light diodes to illuminate luminescent or phosphorescent bar code symbols that are invisibly printed or formed the surface of an article. The scanner has an array of far blue or UV LEDs or laser diodes on its distal face, and a nosepiece or shroud mounted on the distal face of the scanner device. There can be a transparent plate at the distal end of the nosepiece, mounted at an angle to the optic axis, and a filter (yellow or orange) in advance of the imager device within the scanner.

11 Claims, 3 Drawing Sheets

PHOSPHORESCENT OPTICAL SYMBOL SCANNER

BACKGROUND OF THE INVENTION

This invention is directed to optical scanning devices, such as bar code scanners, and is more particularly concerned with an arrangement for reading optical symbols, e.g., small linear or two-dimensional bar code symbols that are directly marked on articles. The invention is more particularly concerned with a combination of a hand-held optical scanner and a black-light illuminator that provides stimulating illumination onto a bar code symbol or other symbol which is formed of a phosphorescent or luminescent material.

Within the past several years, two-dimensional bar code systems have begun to be employed on small articles so that the article can be tracked throughout manufacturing, packaging, and shipping. In some cases, luminescent or fluorescent bar code symbols are invisibly printed onto articles, e.g., onto the base or bottom of a pharmaceutical vial to identify the contents, as well as to provide information about the batch number, date and place of manufacture. Where 2-D symbols are used, these can carry all the required information within a square that may typically be only three millimeters on a side. The symbols can be screen printed or ink-jet printed directly onto the surface or the pharmaceutical vial or other article. At present, machine-mounted camera-based scanner systems are employed, in which the articles proceed past the scanner station, and the articles receive illumination from a discharge-tube type black light source. These scanner systems are bulky and non-portable, so they cannot be carried by an operator. This makes it impossible to read the bar codes in a warehouse, shipping dock or receiving dock environment where the workers could be provided with hand-held scanners. In addition, because of the rather harmful effects from ultraviolet radiation, conventional black light sources typically have to be shielded to protect the workers from exposure to skin or eyes. Consequently, invisibly printed phosphorescent bar code symbols can only be read under special circumstances, as the bulk, weight, and complexity of the reader equipment has limited their widespread usage.

Only recently have short-wavelength diodes, i.e., LEDs, been introduced. There are now LEDs that can emit light in the deep blue to near UV region of the spectrum, and can be used to produce black-light illumination. These have been used notably, in combination with an encapsulation of luminescent phosphors, to create so-called white LEDs, in which the short-wavelength light stimulates the phosphors to create a blend of red, green, and blue light. No one has considered using black-light emitting diodes in connection with any sort of hand-held scanner device to permit their use in reading "invisible" luminescent or fluorescent optical symbols, such as bar codes.

OBJECTS AND SUMMARY OF THE INVENTION

Accordingly, it is an object of this invention to provide an improved hand-held optical symbol scanner that avoids the drawbacks of the prior art.

It is another object to provide a hand-held scanner that is safe and convenient to use for reading invisibly printed fluorescent optical symbols.

It is a further object to provide a hand-held scanner and illuminator that permits a user to read and accurately decode a fluorescent or phosphorescent symbol that has been directly printed on an article and which scanner employs one or more low-power far-blue, UV/blue, UV or similar black-light source, contained within an illuminator portion of the hand-held scanner.

It is still a further object to provide a black-light illuminator that fits on or mounts onto the distal or front of an available hand-held 2-D bar code scanner, so that the scanner can be used in a variety of factory, warehouse, shipping, or retail (e.g., pharmacy) environments.

It is a more specific object that the black-light illuminator be incorporated into the working or distal face of the scanner so that the scanner will pick up the invisible bar code symbol as a pattern of bright and dark regions.

According to one aspect of this invention, a scanner assembly is configured for detecting and decoding a small scale two dimensional optical symbol, such as a 2-D bar code symbol, lying on a surface of an article. The scanner assembly can be a portable (hand-held) contact device, and can be easily adapted for wireless battery-powered operation.

The optical symbol scanner assembly here is adapted for detecting and decoding any of a variety of a bar code symbols or other visible symbol that lies on the surface of an article, with the symbol comprising a pattern of luminescent and non-luminescent areas that can identify lot number and origin of an item. This scanner assembly can be used to advantage in the pharmaceutical, automotive, and other industries, in connection with pharmaceutical vials, security-marked items, consumer product sub-assemblies, and many other types of items. The optical symbol scanner assembly is adapted for detecting and decoding a phosphorescent or luminescent symbol, i.e., a pattern of fluorescent markings non-fluorescent surface, in which the fluorescent markings glow or fluoresce in the presence of black light radiation.

The hand-held scanner device has a housing, with a distal face and light-generating means on the distal face of the housing. This light-generating means produces the black-light illumination and directs it to fall on the luminescent or phosphorescent symbol. The light generating means includes at least one black-light emitting diode, and preferably an array of such diodes. A focusing lens group is positioned on the optic axis of the scanner for focusing an image of the symbol onto a solid-state imager device positioned proximally of the lens group within the scanner device. In a preferred embodiment, an array of LEDs is mounted at the distal face of the scanner housing and the LEDs are spaced left and right of the optic axis.

A nosepiece, i.e., a shield or shroud, is mounted on the distal face of the scanner device, and has an optical passageway whose optic axis is aligned with the optic axis of the scanning device. An illumination channel within the shield conducts the illumination, that is, directs and guides the black light emitted by the diodes, so that black light illumination impinges on the symbol and the scanner device views an image of the symbol as produced by its fluorescent markings.

Preferably, the nosepiece is in the form of a hollow shroud, and includes at a distal end thereof a dust window of a material that is transparent to black light illumination. The window can be a transparent plate that is tilted, i.e., oriented at a non-right angle, with respect to the optic axis.

The nosepiece or shield can be formed acrylic material or equivalent, and provided with an opaque coating.

The black-light producing LEDs are preferably of the type that produce illumination in the far blue to near ultraviolet region, i.e., between 350 run and 420 run, and preferably between about 390 nm and 405 nm.

An optical filter is interposed along the scanner's optical axis in advance of the imager device. This may be a yellow or orange filter for passing light that fluoresces from the markings, but blocking the black light from the diodes so that the illumination does not flood and blind the imager.

In the preferred embodiments of this invention, the bar code symbols emit visible, i.e., white light when stimulated by the far blue or UV radiation, and the imager device in the scanner is configured to respond to visible light images. However, the invention is not limited only to these embodiments, and it is possible for scanners of this invention to be employed with bar code symbols that emit other wavelengths when illuminated with black light.

Available diodes can have a principal wavelength of 370, 390, or 405 nm, e.g., and 405 nm is preferred as it does emit an amount of blue light that is sufficiently visible to indicate when the device is ON. These devices all emit what is generally referred to as black light illumination, that is, wavelengths sufficiently short (energetic) so as to stimulate the fluorescent materials used in printing the bar coded symbols to produce visible light that can be picked up by the imager in the scanner. The stimulating light can be in the blue (or violet) end of the visible spectrum or beyond it in the UV region.

In order to accommodate these black-light diodes, the power circuitry within the scanner has to be modified slightly. While the usual red and IR LEDs that are conventionally used have a forward voltage of about 1.8 volts, the blue and UV LEDs used in embodiments this invention require a forward voltage of about 3.7 volts. This means that where the conventional scanner has its red or IR LEDs connected in series, the scanner with the black light diodes will have to place the diodes in parallel, with a further series dropping resistance so that the illuminator can operate in the same environment and produce the required black light illumination.

The nosepiece is preferably in the shape of a truncated pyramid, i.e., frustum of a pyramid, and may be formed conveniently of acrylic sheet, and coated or covered with a black (opaque) coating material. Other opaque materials may be used. A suitable warning label placed on a top surface of the nosepiece warns the user against potential injury from the radiation.

The above and many other objects, features, and advantages of this invention will present themselves to persons skilled in this art from the ensuing description of preferred embodiments of this invention, as described with reference to the accompanying Drawing.

DETAILED DESCRIPTION OF THE PREFERRED EMBODIMENT(S)

Figure 1:
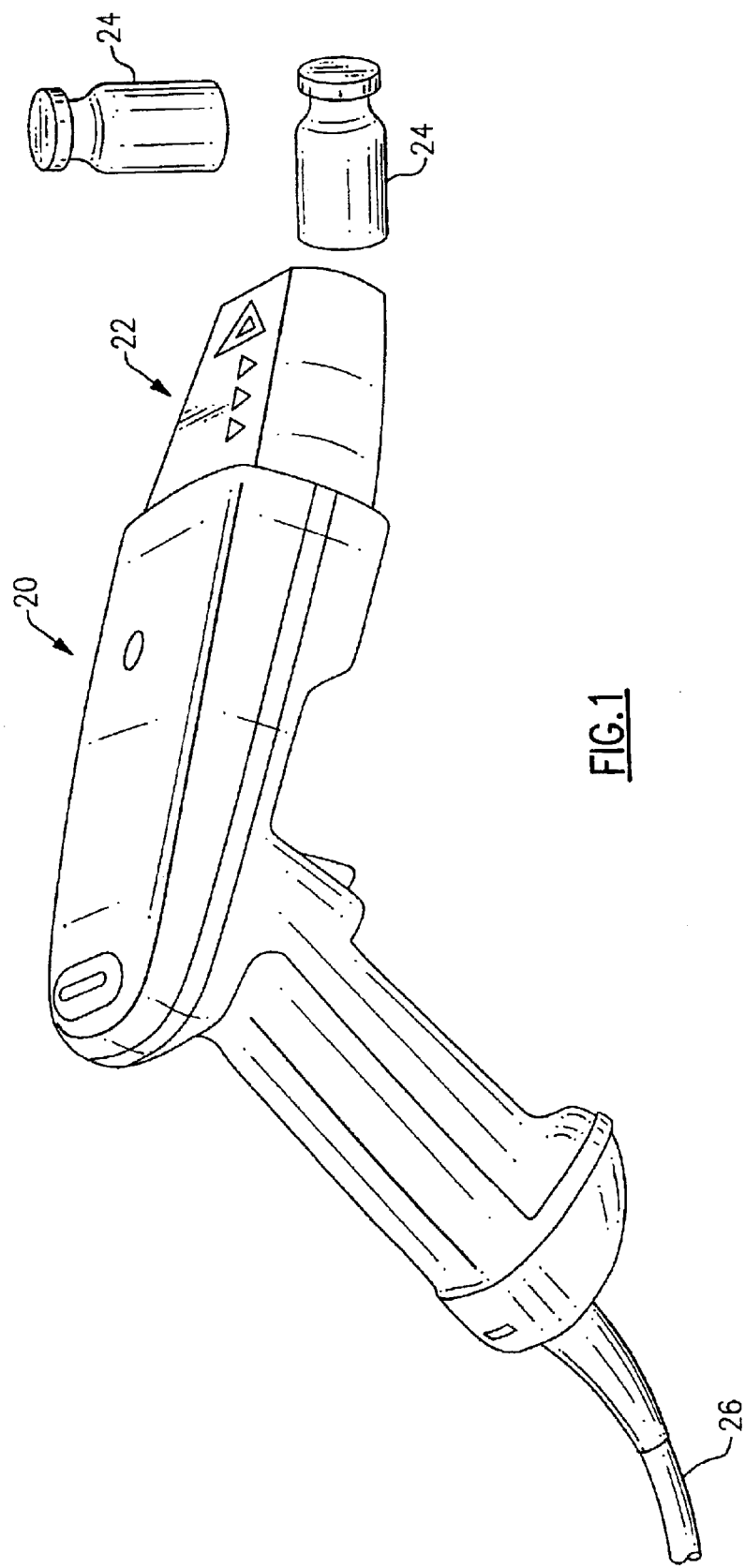
FIG. 1 is a perspective view of a bar code scanner with a black-light illuminator, according to an embodiment of this invention.

With reference to the Drawing, and initially to FIG. 1, a hand-held data inputting scanner 20, i.e., a hand-held two dimensional bar code scanner, includes an illumination attachment which incorporates a nosepiece 22, according to an embodiment of this invention, with the nosepiece being mounted on the front or distal end of the body of the scanner 20. The scanner of this embodiment employs black-light illumination and is designed to read a bar code symbol that is invisibly printed on a surface, here on the base of a vial 24 of the type used for containing medication. The bar code symbol may be linear, 2-D or 3-D, and is intended here to identify the contents of the vial 24, including the type of pharmaceutical, place of manufacture, date, and batch number, plus other required information. This information is initially used for automated processing in factory, and is typically read in an automated device in which black light, i.e., ultraviolet, is provided from a discharge tube to illuminate the bottoms of the vials as they pass by on a production line. The bulkiness and non-portability of the equipment has made it impractical to employ it in other environments. Here, the hand-held scanner 20 permits a user in a warehouse, shipping location, or at a customer location to check the contents of the vials on an individual basis by reading the fluorescent bar coded symbols.

The scanner assembly can be a contact device, in which the tip of the nosepiece 22 is positioned either in contact with the bottom of the vial 24 or within a few millimeters of it. The scanner device has a distal face on which is positioned light generating means, e.g., an array of LEDs, for producing illumination to fall on the symbol, and focusing means to focus an image of said symbol on an imager device positioned proximally of the focusing means in said scanner device. Various known coding can be used for the symbols. At the base of the handle of the scanner is a coiled cord 26, which can connect to a computer, or interface to a wireless device.

Figure 2:
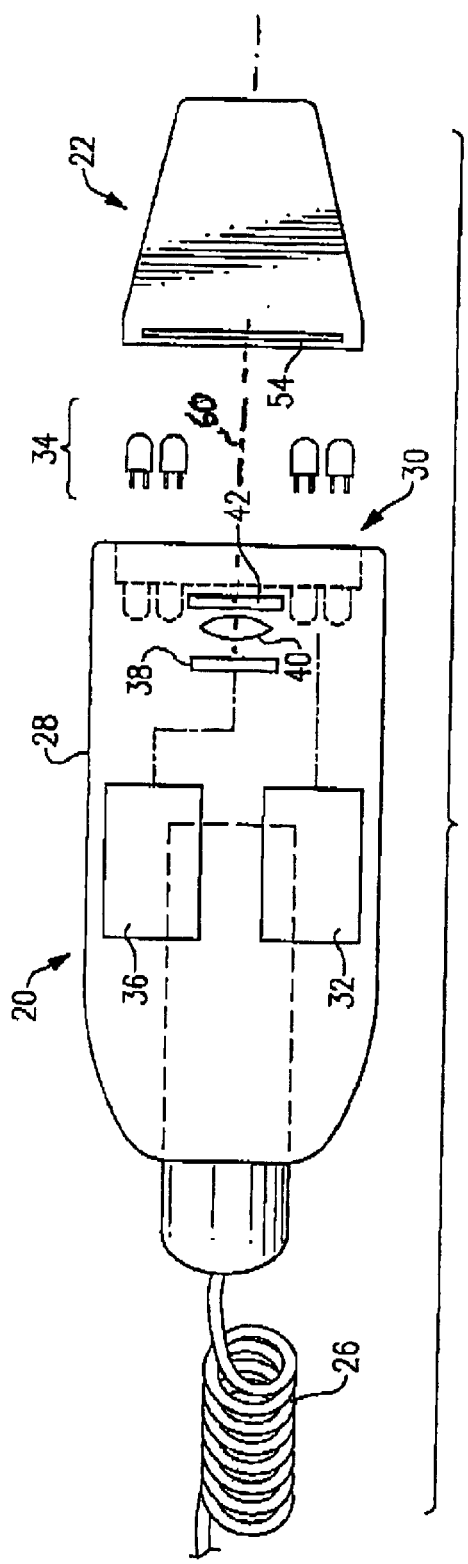
FIG. 2 is a top exploded view of the scanner of this embodiment.

As shown in FIG. 2, the scanner 20 comprises a housing or shell 28, with a front or distal end 30. An internal circuit board 32 provides power to an array of power illumination diodes 34, i.e., LEDs, which here provide far blue and/or near ultra-violet wavelengths, in this embodiment with a center wavelength of 405 nm. A second internal circuit board 36 is associated with a solid-state imager 38, such as a CCD device. A focusing lens or lens group 40 defines an optic axis 60 for the scanner, and focuses the image of the symbol onto the imager device 38. An optical filter 42 is situated along the optic axis 60 in advance of the imager 38, in this embodiment between the lens 40 and the imager 38. As mentioned before, this filter 42 is designed to pass the longer visible wavelengths, and suppress the wavelengths of the diodes 34 so that the illumination from them does not flood and blind the imager. This can be generally a yellow or an orange filter. The diodes 34 are positioned on the distal end 30, with several of each on either side of the optic axis 60.

The LEDs 34 are diodes that emit in the far blue to near ultraviolet region of the electromagnetic spectrum, which can be wavelengths between about 350 nm to about 430 nm. Available diodes can have a principle wavelength of 370, 390, or 405 nm, e.g., and 405 nm is preferred as it does also emit an amount of blue light that is sufficiently visible to indicate when the device is ON. These diodes emit what is generally referred to as black-light illumination, that is, wavelengths sufficiently short (energetic) so as to stimulate the fluorescent materials used in printing the bar coded symbols to produce visible light that can be picked up by the imager in the scanner. The stimulating light can be in the blue (or violet) end of the visible spectrum or beyond it in the UV region.

In order to accommodate these black-light diodes 34, the power circuitry within the circuit board 32 has to be modified slightly. Whereas the usual red and IR LEDs that are conventionally used in this type of scanner have a forward voltage of about 1.8 volts, the blue and UV LEDs used in embodiments this invention require a forward voltage of about 3.7 volts. This means that where the conventional scanner has its red or IR LEDs connected in series, the scanner with the black light diodes will have the diodes wired in parallel, with a further series dropping resistance so that the illuminator can operate in the same environment and produce the required black light.

The nosepiece 22 is in the form of a hollow shield or shroud, i.e., a hollow member that contains and directs the black light radiation so that if reaches only the intended zone, i.e., the target or symbol. The nosepiece is mounted on the distal face of said scanner device, and forms an optical passageway with an optic axis aligned with the optic axis of said scanning device.

Figure 3:
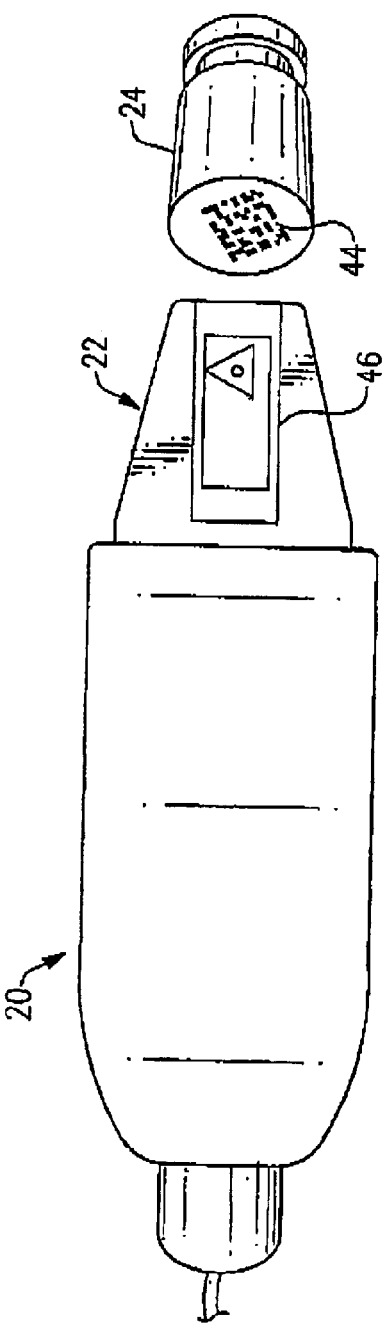
FIG. 3 is a top plan view of this embodiment, illustrating its use with a pharmaceutical vial having invisible bar coding thereon.

As shown in FIG. 3, the scanner 20 is employed by placing the nosepiece 22 very near or against the bottom of the vial 24, so that the 2-D bar coded symbol 44 will be visible through the distal end of the nosepiece. There the symbol 44 would normally not be visible, as it would appear as clear material on a transparent vial or white on a white vial. However, in the presence of stimulating UV or other black light, the phosphorescent ink will make the symbol 44 visible, generally as illustrated here. The nosepiece 22 is opaque to the black-light wavelengths, except out through its tip. A caution label 46 is placed on the upper surface of the nosepiece, as shown, to warn the user to avoid direct exposure of the radiation to eyes or skin.

Figure 3A:
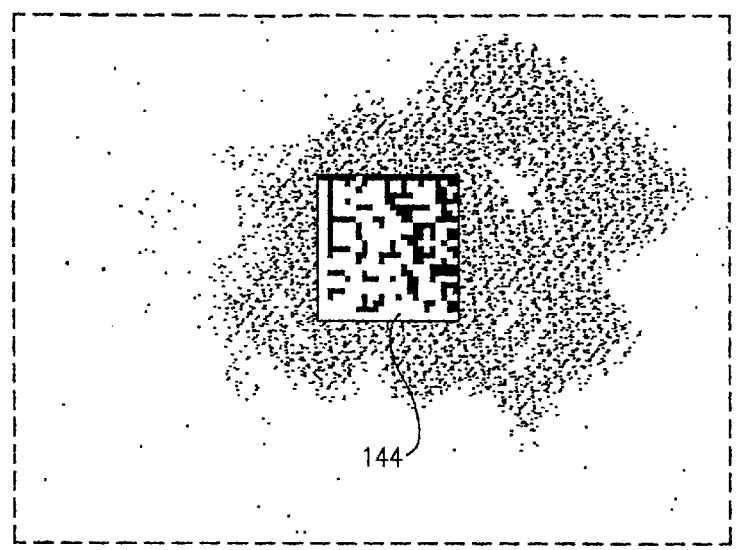
FIG. 3A is an illustration of the image of the two-dimensional symbol as picked up by the scanner of this embodiment.
Figure 4A:
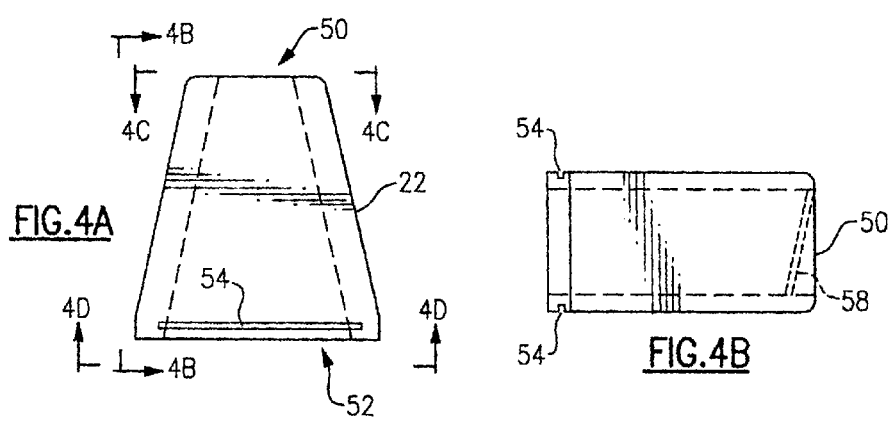
FIGS. 4A to 4D are a top view of the nosepiece of this embodiment, a side elevation, a front view and a back view, respectively, with FIG. 4B being taken along line 4B—4B, FIG. 4C taken along line 4C—4C, and FIG. 4D taken along line 4D—4D of FIG. 4A, respectively.
Figure 4B:
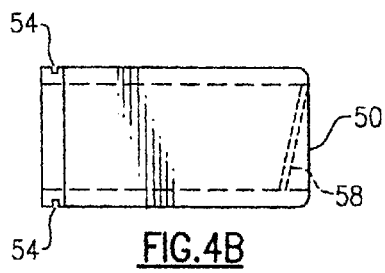
Figure 4C:
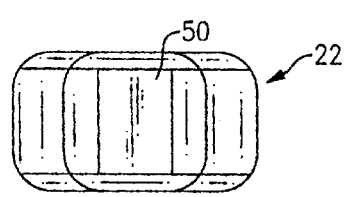
Figure 4D:
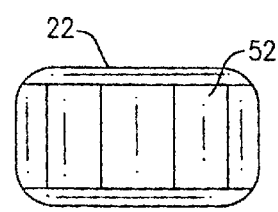

FIG. 3A shows a typical video image 144 of the label or symbol 44, as picked up and captured on the imager device 38. As illustrated here, the 2-D image 144 can be easily decoded using standard software, so the scanner black-light diodes do not need to be energized for more than a fraction of a second for each vial.

As shown in FIGS. 4A to 4D, the nosepiece 22 or shield can be formed as a truncated pyramid or pyramid frustum, from ¼-inch thickness acrylic sheet material, assembled so as to have a hollow interior, a window opening 50 at the narrow distal end and a wide opening 52 at the base or proximal end. There are lateral slots 54 in the top and bottom walls near the proximal end that mate with engaging ridges within a seating recess at the distal face 30 of me scanner. A thin glass plate 58 that serves as a dust beer window is positioned at the distal window opening 50. This transparent plate 58 is transparent with respect to the black-light illumination and also to the visible light produced by the phosphorescent bar coded symbols. The window plate 58 is oriented at a tilt, i.e., non-right angle, with respect to the optic axis 60, so that illumination does not reflect directly back towards the lens 40 and imager 38. The nosepiece 22 of this embodiment is about two inches in length, one inch thick, and one-and-three-quarters inches wide at its proximal end. The distal window opening 50 is preferably about one-half inch by three-quarters inch, so that the 3-mm by 3-mm symbol 44, or any of a variety of smaller symbols or somewhat larger ones, can be viewed through it. The actual dimensions of the window opening are not critical. The window opening 50 accommodates a field of view of 0.55 inches (14 mm) square. The acrylic material is preferably coated with a black (opaque) material on the outside surface, although it is possible that the acrylic can be made up as opaque material. The shield or nosepiece 22 serves as a guide for the illumination so that when the target, i.e., symbol 44, is properly positioned at the tip or window opening 50, the target can be properly illuminated and scanned. The scanner 20 has a sensitivity adapted for use in ambient conditions from darkness up to 100 lux. The codes associated with the bar coded symbols can be Data Matrix, Code 39, Code 128, Codabar, I-2of5, UPC or other popular codes. The scanner 20 has a power requirement of only 4 to 9 volts DC, with a current draw (average) of only 175 mA.

In other embodiments, the shroud or nosepiece 22 could be of a different shape, or made with different materials, as suits the specific application.

While the invention has been described with respect to one preferred embodiment, it should be understood that the invention is not limited to that specific embodiment. Rather, many modifications and variation would present themselves to persons skilled in this art without departing from the scope and spirit of this invention, as defined in the appended claims.

We claim:

1. An optical symbol scanner assembly for detecting and decoding a symbol lying on a surface of an article, the symbol comprising a pattern of fluorescent markings on a non-fluorescent surface, said fluorescent markings fluorescing in the presence of black light radiation, the assembly comprising:

a hand-held scanner device having a distal face on which is positioned light-generating means for producing illumination to fall on said symbol, said light generating means including at least one black-light emitting diode, and focusing means for focusing an image of said symbol on an imager device positioned proximally thereof within said scanner device, said focusing means defining all optic axis; and a shield mounted on the distal face of said scanner device, with an optical passageway having an optic axis aligned with the optic axis of said scanning device, and an illumination channel within the shield for directing and guiding the black light emitted by said diodes, herein said diodes, wherein said shield is in the form of a hollow nosepiece having a open, wide proximal end fitting onto the distal face of said hand-held scanner device and a narrow distal end that is transparent to said black light, and a tapered shell that is opaque to said black light and that narrows in the direction towards the distal end, such that said black light illumination impinges on said symbol and the scanner device views the symbol as produced by said fluorescent markings.

2. An optical symbol scanner assembly according to claim 1 wherein the shell of said shield is formed acrylic material, and is provided with an opaque coating.

3. An optical symbol scanner assembly according to claim 1, further comprising an optical filter on said optical axis in advance of said imager device for passing light fluorescing from said markings, but blocking illumination emitted from said at least one diode.

4. An optical symbol scanner assembly according to claim 1 wherein said shield includes at the distal end thereof a plate of a material that is transparent to said black light illumination, said plate traversing across the optic axis as defined by said focusing device.

5. An optical symbol scanner assembly according to claim 4 wherein said plate of material is oriented at a non-right angle to said optic axis such that the black light impinging on said plate is not reflected directly back to said imager device.

6. An optical symbol scanner assembly according to claim 1 wherein said light-generating means includes an array of LEDs mounted at a distal face of said housing and spaced from said optic axis.

7. An optical symbol scanner assembly according to claim 6 wherein said light generating means further includes an electric drive circuit that provides a forward voltage of at least 3.7 volts to each of said LEDs.

8. An optic symbol scanner assembly according to claim 1 wherein said light producing means includes a plurality of LEDs that produce illumination in the far blue to near ultraviolet region.

9. An optical symbol scanner assembly according to claim 8 wherein said light generating means further includes an electric drive circuit that provides a forward voltage of at least 3.7 volts to each of said LEDs.

10. An optical symbol scanner assembly according to claim 8 wherein said LEDs produce illumination between 350 nm and 420 nm.

11. An optical symbol scanner assembly according to claim 10 wherein said LEDs produce illumination between about 390 nm and 405 mm.

* * * * *

UNITED STATES PATENT AND TRADEMARK OFFICE
CERTIFICATE OF CORRECTION

PATENT NO.         : 6,824,061 B1
APPLICATION NO.    : 10/633136
DATED              : November 30, 2004
INVENTOR(S)        : John R. Hattersley et al.

It is certified that error appears in the above-identified patent and that said Letters Patent is hereby corrected as shown below:

Col. 5, line 55:

"me" should read --the--

Col. 5, line 56:

"beer" should read --barrier--

Col. 6, lines 47-48:

--the words "herein said diodes" between the commas should be deleted--

Signed and Sealed this

Eighth Day of January, 2008

JON W. DUDAS
*Director of the United States Patent and Trademark Office*